Patented June 14, 1938

2,120,741

UNITED STATES PATENT OFFICE 2,120,741

DERIVATIVES OF DYESTUFFS CONTAINING HYDROXYL GROUPS AND PROCESS OF MAKING SAME

Charles Graenacher and Heinrich Bruengger, Basel, and Franz Ackermann, Binningen, Switzerland, assignors to the firm of Society of Chemical Industry in Basle, Basel, Switzerland No Drawing. Application July 23, 1936, Serial No. 92,245. In Switzerland August 17, 1935

9 Claims. (Cl. 260—42)

It has been found that the solubility in water of dyestuffs containing at least one hydroxyl group can be increased by causing these dyestuffs to react with acylating agents which contain at least one substituent in addition to the acylating group which can be converted into a quaternary ammonium group by a simple reaction of addition, and then effecting this addition.

The dyestuff derivatives thus obtained correspond to the general formula $R_1$—O—$R_2$ wherein $R_1$ represents the radical of a dyestuff containing at least one hydroxyl group, and $R_2$ represents an acyl radical containing a quaternary ammonium group. These new products are characterized by the solubility of their salts in water, and by the property of regenerating the more sparingly soluble parent dyestuffs corresponding to the radical $R_1$ merely by the action of saponifying agents.

The dyestuffs serving as parent material must contain at least one hydroxyl group. Particularly favorable results are obtained with insoluble to sparingly soluble dyestuffs, i. e. with dyestuffs in the production of which components are used which contain no, or only few, groups lending solubility, for example carboxyl or sulfonic groups, and if, for example in the case of the azo-dyes, at least one of the components contains a hydroxyl group or an enolizable keto group.

If azo-dyes are used, they may belong to the mono-, dis or polyazo-series. They may, for example, be produced from diazotized aromatic amines of the benzene or naphthalene series which may contain substituents, for example hydroxyl groups, and suitable coupling components, for example arylamines, phenols or compounds having methylene groups capable of coupling. Azo-dyes may also advantageously be used in the production of which at least one component lending affinity to vegetable fibers has been used. Such components are for example diphenyl, stilbene, thiazole, diarylazoxy- and carbazole derivatives, as well as amines bound by urea, thiourea, diazine, triazine, benzoyl and cinnamoyl radicals, and further certain aminonaphthols. The azo-dyes serving as parent materials may also contain metals in complex union, such as chromium, copper, iron, nickel or cobalt.

Also dyes of classes other than the azo-dyes are suitable for this process, for example dyes of the anthraquinone series having a hydroxyl group, and hydroxyl derivatives of suitable dyes of the azine, oxazine, thiazine, arylmethane and rhodamine series or the like. In this case also the dyes may be synthesized in such manner that they contain groups which increase their affinity to vegetable fibers.

Acylating agents containing at least one substituent in addition to the acylating group which can be converted into a quaternary ammonium compound by a simple reaction of addition, are for example halides of aliphatic, hydroaromatic or aromatic carboxylic acids which contain as further substituents for example tertiary alkylamino groups which, as is known, add halogen alkyl or analogues thereof with formation of quaternary ammonium compounds, or substituents which add tertiary bases with formation of quaternary ammonium compounds. These groups can be transformed during or after the action of the acylating agent on the dyestuff into the quaternary ammonium compounds. This is the case if the acylation is carried out in the presence of tertiary bases, for example dialkylamino-benzenes, and particularly in the presence of cyclic tertiary bases, such as, for example, pyridine or quinoline. As examples of acylating agents which can be used in connection with the present invention there may be mentioned the 4-dialkylamino-1-benzoyl halides, the 4-halogenalkyl-1-benzoyl halides, the sulfocarboxylic acids the sulfonic group of which is esterified and the carboxyl group of which is in the form of an acid chloride group, and the like.

The acylation can be carried out by the usual methods, such as by heating the dyes with the acylating agents with or without addition of agents which bind acid, or preferably in the presence of tertiary bases, particularly pyridine, or of indifferent solvents.

The derivatives obtainable by the invention give valuable transformation products, and can be used for dyeing the most varied materials, for example vegetable fibers, animal fibers, such as wool, silk, leather, or artificial fibers, such as regenerated cellulose or cellulose derivatives, and artificial masses.

They are more or less readily soluble in water. Their aqueous solutions or suspensions may be used for dyeing and printing any desired material in such manner that the goods, after having been dyed, padded or printed by known processes, are subjected to a saponifying treatment for example with alkalis or agents developing basic substances, such as ammonia, sodium carbonate, caustic soda solution, trisodium phosphate or alkali acetate, whereby the dye initially acylated is fixed as a pigment on the material, and in particular is rendered fast to washing. The saponification of the acylated dyestuffs can also be effected in lacquers and artificial masses. In many cases the treatment with saponifying agents can be applied in the dyeing operation.

If dyes are used which can form metallic complexes, a treatment with a compound yielding a metal can be applied before, during or after the saponification on the fiber in the dye bath, in lacquers and artificial masses or to the dye in substance, whereby a metalliferous pigment is deposited on the fiber or in the material, or the dye in substance is converted into a metalliferous pigment.

In contradistinction to the soluble acyl derivatives of the leuco-compounds of vat dyes, the derivatives produced by this invention need no oxidizing agent for their development.

As mentioned above, the present invention is applicable to all dyestuffs containing OH-groups. It is particularly valuable with dyestuffs which due to their sparing solubility cannot be dyed as such. Such dyestuffs are for example the insoluble azodyestuffs consisting for example of diazo compounds which contain in addition to the diazonium group no group capable of rendering the dye soluble, and such coupling components which contain neither sulfonic groups nor carboxyl groups. Products of this kind are for example phenol, particularly the hydroxy compounds of the benzene series which couple with diazo compounds in ortho-position to the OH-group, such as cresol, chlorocresol, and phenol- or cresol-carboxylic acid arylides, α- and β-naphthols, and the substitution products thereof which contain no sulfonic or carboxyl groups, and in which the substituents are arranged in the molecule in such a manner that the azo-group enters in ortho-position to the OH-group. Such coupling components are for example the arylides of 2:3-hydroxy-naphthoic acid, the arylides of 1-hydroxy-naphthalene-4-carboxylic acid, the amides from naphthol or aminonaphthol-sulfonic acids and secondary amines, the sulfones corresponding to the naphthol or aminonaphthol-sulfonic acids, and the like.

As products which are of particular interest for the present process there may be mentioned the insoluble dyestuffs from arylides of 2:3-hydroxy-naphthoic acid and analogues of these arylides, such as for example arylides of 2:3-anthracene-hydroxycarboxylic acid, arylides from hydroxy-carbazole- or naphthocarbazole-hydroxycarboxylic acids, further the azo-dyestuffs from the above mentioned hydroxy compounds of the benzene series which couple in ortho-position to the OH-group and such diazotized aminoazo-dyestuffs which, in addition to the diazonium group, contain no group capable of rendering the dye soluble. Such diazo compounds are for example diazotized ortho-aminoazo-toluene or tetrazotized 4:4'-diamino-5-methoxy-3-methyl-azobenzene.

Reference is also made to the fact that according to the present process valuable products can further be obtained from sulfonated dyestuffs. In this connection there may be mentioned for example the sparingly soluble sulfonated dyestuffs containing hydroxyl groups which are fixed to the fiber for example by further diazotizing and developing with β-naphthol or phenylmethylpyrazolone, or by developing with diazotized paranitranilines or also after-developing with metal salts. Thus, according to the present process, otherwise useless dyestuffs such as are obtained by combining diazotized aniline, diazotized xylidine or diazotized β-naphthylamine, or tetrazotized 3:3'-diaminodiphenylmethane with one mole. or two moles of the 2-(3'-aminobenzoyl)-amino-5-hydroxynaphthalene-7-sulfonic acid, diazotizing or tetrazotizing the dyestuff thus obtained again, and combining it with β-naphthol, resorcin or phenylmethylpyrazolone, can easily be converted into water-soluble dyestuffs which dye the fiber well and which regenerate the sparingly soluble fast dyestuffs on the fiber by a simple treatment with mildly acting saponifying agents.

The following examples illustrate the invention, the parts being by weight:—

*Example 1*

6 parts of the azo-dye produced by coupling diazotized 1-aminonaphthalene and 2-hydroxy-naphthalene are dissolved by boiling in 80–100 parts of pure pyridine, and 5.4 parts of 4-chloro-methyl-1-benzoyl chloride are then quickly added with continual stirring. The dark red color of the solution changes to brown, and after a short time the product begins to crystallize. The temperature is allowed to fall to about 80° C., and the mixture is stirred for approximately one hour at this temperature. After cooling, the product is filtered and dried on a water bath in a vacuum. The product is an orange-red crystalline powder which forms a yellow-red solution in hot water. It is purified by recrystallization from alcohol, and gives shining red-orange plates of the probable formula

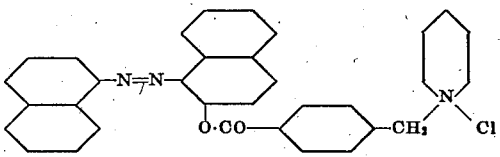

By mixing a hot aqueous solution of this dye with dilute alkali, it decomposes after a short time into the completely insoluble original dye.

*Example 2*

8.4 parts of the azo-dyestuff (melting point 262–263° C.) obtained by coupling diazotized 1-amino naphthalene and 2:30-hydroxynapthoic acid anilide are dissolved by boiling in the necessary quantity of pyridine. 9 parts of 4-chloromethyl-1-benzoyl chloride are then poured in. The temperature is now maintained at about 80° C. for 2½ hours. An oily product separates after a short time. After cooling, the oil forms a dark sticky mass on the bottom of the vessel, from which the pyridine, containing the unchanged parent material insoluble in water, can be decanted. The product is washed with warm pyridine, and when dried in a vacuum at 100° C. becomes a dark powder. It dissolves to a brown-red clear solution in hot water, and decomposes into the parent dye shortly after adding alkali.

*Example 3*

2.5 parts of the dye formed by coupling tetrazotized 4:4'-diamino-1:1'-diphenyl and 2-hydroxynaphthalene are dissolved by boiling in the necessary quantity of pyridine, and 3.8 parts of 4-chloromethyl-1-benzoyl chloride is poured in. The temperature is then allowed to fall to 80° C. Shortly after the addition of the chloromethyl-benzoyl chloride the product begins to separate partly as a solid, partly as a viscous liquid. After stirring for an hour the greater part of the pyridine is distilled in a vacuum, and the radical is recrystallized from hot alcohol. In this manner the addition product of the acylated dye with pyridine is obtained in the form of a red powder, which dissolves in water to a yellow-red solution, and becomes the parent product when heated with alkali.

The following table gives the particulars of further products which can be produced by this invention:—

| Dyestuff | Acylating agent | Color of aqueous solution |
|---|---|---|
| (1) Dianisidine→β-naphthol | 4-chloromethyl-benzoyl chloride. | Brown. |
| (2) 2-methyl-4:4'-diamino-5-methoxyazobenzene→β-naphthol. | ......do.............................. | Brown. |
| (3) 1-naphthylamine→β-naphthol | Dimethylamino benzoyl-chloride+dimethyl-sulfate. | Yellow-brown. |
| (4) 1-naphthylamine→β-naphthol | Nicotinic acid chloride........ | Yellow-red. |
| (5) 1:5-dibenzoyldiamino-4:8-dihydroxyanthraquinone | Chloromethylbenzoyl - chloride. | Yellow-brown. |
| (6) Dihydroxy-N-dihyrdo-1:2:2':1'-anthraquinonazine | ......do.............................. | Yellow-brown. |
| (7) Benzene-2-benzene'-2'-dihydroxydibenzanthrone | ......do.............................. | Violet. |
| (8) Eriochrome Azurol (Colour Index No. 720) | ......do.............................. | Light yellow. |
| (9) Modern Violet (Colour Index No. 892) | ......do.............................. | Dirty green. |

What we claim is:—

1. Process for the manufacture of derivatives of dyestuffs containing at least one hydroxyl group, consisting in causing these dyestuffs to react in the presence of pyridine with acylating agents which contain at least one substituent which can be converted into a quaternary ammonium compound by a simple reaction of addition, and then effecting this addition.

2. Process for the manufacture of derivatives of dyestuffs containing at least one hydroxyl group, consisting in causing these dyestuffs to react in the presence of pyridine with a benzoylating agent which contains at least one substituent which can be converted into a quaternary ammonium compound by a simple reaction of addition, and then effecting this addition.

3. Process for the manufacture of derivatives of dyestuffs containing at least one hydroxyl group, consisting in causing these dyestuffs to react in the presence of pyridine with acylating agents which contain at least one substituent in addition to the acylating group which can be converted into a quaternary ammonium compound by addition to a tertiary amine.

4. Process for the manufacture of derivatives of azo-dyestuffs containing hydroxyl groups, consisting in causing these azo-dyestuffs to react in the presence of pyridine with acylating agents which contain at least one substituent in addition to the acylating group which can be converted into a quaternary ammonium compound by addition to a tertiary amine.

5. Process for the manufacture of derivatives of azo-dyestuffs containing hydroxyl groups but containing neither carboxyl groups nor sulfonic groups, consisting in causing these azo-dyestuffs to react in the presence of pyridine with acylating agents which contain at least one substituent in addition to the acylating group which can be converted into a quaternary ammonium compound by addition to a tertiary amine.

6. Process for the manufacture of derivatives of azo-dyestuffs containing hydroxyl groups but containing neither carboxyl groups nor sulfonic groups, consisting in causing these dyestuffs to react in the presence of pyridine with the 4-chloromethylbenzoylchloride.

7. Process for the manufacture of derivatives of azo-dyestuffs containing hydroxyl groups but containing neither carboxyl groups nor sulfonic groups, consisting in causing azo-dyestuffs obtained from arylides of 2:3-hydroxynaphthoic acid containing neither sulfonic groups nor carboxyl groups and diazo compounds containing in addition to the diazonium group no group capable of rendering the dye soluble, to react with 4-chloromethyl-1-benzoyl chloride in the presence of pyridine.

8. The dyestuff derivatives of the general formula $R_1$—O—$R_2$ in which $R_1$ represents the radical of a dyestuff containing at least one hydroxyl group, and $R_2$ represents an acyl radical containing a quaternary ammonium group, which products are water-soluble powders which, when treated with mild saponifying agents, regenerate the dyestuff corresponding to the radical $R_1$.

9. The azo-dyestuff derivatives of the general formula

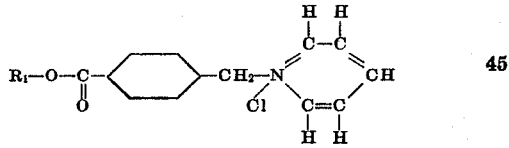

in which $R_1$ represents the radical of an azo-dyestuff which is obtained by combining an arylide of the 2:3-hydroxynaphthoic acid containing neither sulfonic groups nor carboxyl groups, with diazo compounds containing in addition to the diazonium group no group capable of rendering the dye soluble, which products are water-soluble powders which, when treated with mild saponifying agents, regenerate the dyestuff corresponding to the radical $R_1$.

CHARLES GRAENACHER.
HEINRICH BRUENGGER.
FRANZ ACKERMANN.